United States Patent [19]
Ball

[11] 3,817,288
[45] June 18, 1974

[54] HOSE PIPES

[75] Inventor: Eric Ball, Newcastle-upon-Tyne, England

[73] Assignee: Dunlap Holdings Limitied, London, England

[22] Filed: Jan. 22, 1971

[21] Appl. No.: 108,728

[30] Foreign Application Priority Data
Jan. 26, 1970 Great Britain...................... 3686/70
May 21, 1970 Great Britain.................. 24693/70

[52] U.S. Cl. .............................................. 138/125
[51] Int. Cl. ............................................ F16l 11/00
[58] Field of Search .......... 138/123, 124, 125, 137, 138/126, 129, 132, 130

[56] References Cited
UNITED STATES PATENTS

| | | | |
|---|---|---|---|
| 1,255,867 | 2/1918 | Fentress............................ | 138/125 |
| 2,019,709 | 11/1935 | Kennedy............................ | 138/126 |
| 2,899,982 | 8/1959 | Harpfer............................. | 138/126 |
| 2,988,130 | 6/1961 | Rittenhouse....................... | 138/126 |
| 3,047,026 | 7/1962 | Kahn................................. | 138/124 |
| 3,093,160 | 6/1963 | Boggs................................ | 138/125 |
| 3,117,597 | 1/1964 | Fritz et al. ....................... | 138/125 |
| 3,329,173 | 7/1967 | Skoggard........................... | 138/125 |
| 3,446,247 | 5/1969 | Manning............................ | 138/137 |
| 3,500,869 | 3/1970 | Skoggard........................... | 138/130 |
| 3,502,113 | 3/1970 | Bjorksten.......................... | 138/129 |
| 3,528,457 | 9/1970 | Martin............................... | 138/137 |
| 3,540,486 | 11/1970 | Flounders.......................... | 138/125 |
| 3,604,461 | 9/1971 | Mathews........................... | 138/125 |

FOREIGN PATENTS OR APPLICATIONS
850,421  6/1957  Great Britain..................... 138/125

*Primary Examiner*—Manuel A. Antonakas
*Assistant Examiner*—R. H. Lazarus
*Attorney, Agent, or Firm*—Stevens, Davis, Miller & Mosher

[57] ABSTRACT

A reinforcement structure and a method of assembly of hose-pipe for heavy or light duty use of thick or thin wall construction in which a non-woven matrix material layer supports the reinforcement members in a winding operation during assembly into the hose. More than one layer of matrix may be utilized. The matrix layer and reinforcement members may be applied in the form of a composite strip or strips pre impregnated with polymeric material, of which the following is a specification.

9 Claims, 8 Drawing Figures

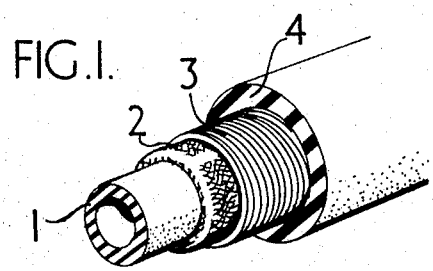
FIG.1.
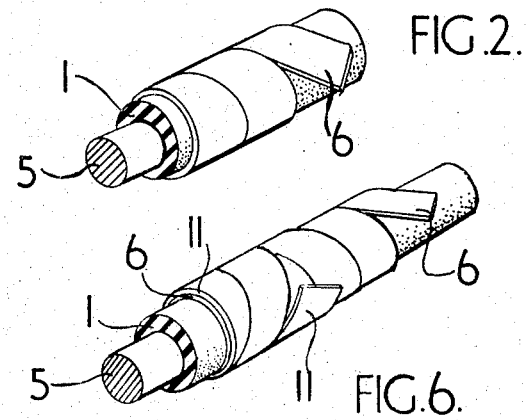
FIG.2.
FIG.6.

HOSE PIPES

This invention relates to hose pipes and in particular to hose pipes having a reinforcement structure.

Such hoses may comprise a rubber or thermoplastic material lining tube, a layer or layers of reinforcing material and an outer cover. The choice of reinforcing materials has hitherto been limited as materials which shrink tend to cut into the lining tube of the hose. This effect is known as "cheese cutting" and is a problem in particular with reinforcement yarns, such as non-heat-set nylon, polyester and polypropylene, each of which has a high shrinkage at the moulding or vulcanising temperature of the hose.

In our earlier U.K. Pat. No. 1,033,547 we have described a hose in which the reinforcement comprises helically wound strips of rubber in which are embedded by calendering spaced parallel reinforcing filaments which extend in the longitudinal direction only of the strip; the strips being bonded together part of them being wound left handed and the remainder being wound right handed.

This hose is cheaper and simpler to manufacture than normal woven fabric reinforced hoses as the strip material is cheaper than woven material or a braided or knitted reinforcement structure and assembly is carried out on a simple lapping machine onto which very long rolls of the material strip may be loaded for long run hoses. It has, however, proved susceptible to "cheese cutting" problems and reinforcement materials which shrink at the hose moulding temperature may only be used with a thick inner lining of a material having a high plasticity at curing temperatures. Moreover only single layer strips have been found practicable to use but the present invention envisages the use of self supporting multi-layer strips.

One further effect of cheese cutting problems in both normal hoses and hoses of the type described in our U.K. Pat. No. 1,033,547 is that hitherto the lining material formulation has had to be chosen to give a material having a relatively high plasticity at the curing temperature to obviate cheese cutting effects.

Hoses of hitherto known construction are of comparatively heavy construction incorporating, to obtain the required strength, multi-layer cord reinforcements and an inner lining and outer cover of substantial thickness. This construction is also stiff and expensive in materials used and it is one object of the invention to provide lighter, more flexible and cheaper hoses than hitherto, in some cases, a substantially wider spacing of reinforcing cords being utilisable.

According to one aspect of the present invention a hose pipe comprises a tube of polymeric material and an embedded reinforcement structure wherein the reinforcement structure comprises at least one layer of reinforcement members and at least one layer of non-woven matrix material or support membrane which supports the reinforcement members and stiffens the hose assembly.

Another aspect of the invention provides a hose wherein the non-woven matrix material is impregnated with polymeric material.

Another aspect of the invention provides a hose reinforced by at least one layer of non-woven matrix material and two or more layers of helically wound strips of material containing longitudinally extending parallel filaments. The non-woven matrix layer may also be provided within the strip of reinforcement and multiple strips of reinforcement and matrices may be used.

Yet another aspect of the invention provides a hose comprising only helically wound strips of reinforcement containing a non-woven matrix support layer, there being provided no inner lining or outer cover or only one of these may be provided.

Another aspect of the invention provides a method of manufacturing a hose reinforcement structure comprising forming a matrix layer of non-woven material, applying a layer of parallel reinforcing members to the matrix layer, the said layer being embedded in a polymeric material.

The invention provides also a method in which the matrix layer is formed in situ onto the layer of reinforcing members.

Other aspects of the invention will be apparent from the following description of some embodiments of the invention. These embodiments are described in conjunction with the accompanying diagrammatic drawings in which:

FIG. 1 is a hose sectioned in a stepwise manner to show the successive layers of its construction;

FIG. 2 illustrates the winding of hose reinforcement;

FIG. 6 illustrates the winding of two reinforcement strips;

Figure 3:
FIG. 3 illustrates one form of reinforcement strip.

The hose illustrated in FIG. 1 is manufactured by extruding a tubular inner lining 1 of unvulcanised rubber composition onto a steel mandrel and then applying a support layer 2 in the form of a sheet of non-woven matrix of nylon filaments (each filament being 5 denier), nylon being a material of relatively high elasticity. The matrix is assembled by heating under light pressure a thin layer of randomly arranged filaments to cause bonding at the cross-over points of the filaments and to form the sheet of material. The filaments are spaced to produce a fairly open structure which is impregnated with rubber latex, cut into strips of material and is helically wrapped onto the surface of the inner lining 1. A reinforcement layer 3 is applied over the support layer 2 in the form of a helical winding of nylon cords. An outer layer 4 of unvulcanised rubber composition is extruded over the reinforcement layer 3 and the assembly is then heated to vulcanise the rubber components together.

In the simple unbalanced hose construction described the support layer 2 acts to prevent the shrinkage of the reinforcement layer 3, on heating during vulcanisation from "cheese cutting" into the inner lining 1 and also strengthens or stiffens the hose assembly.

In another embodiment of the invention illustrated in FIG. 2 the hose is manufactured by extruding an inner lining 1 of uncured rubber onto a mandrel 5 and applying a composite strip 6 by helically winding it around the inner lining.

The lightweight, flexible composite strip is illustrated in FIG. 3 and comprises a porous matrix support layer 7 of non-woven interconnected nylon filaments, as in the previous embodiment, with a layer of parallel spaced-apart longitudinally extending reinforcing filaments 8 of nylon filaments overlying the support layer 7. The two layers are impregnated with rubber latex 9 to form the composite strip.

The assembled hose is cured by the application of heat and the support layer functions as in the previous embodiment, once again the hose structure being a simple one of unbalanced form.

Figure 4:
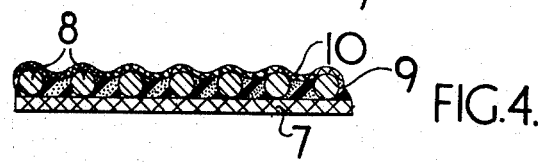
FIG. 4 illustrates an alternative form of reinforcement strip.
Figure 5:
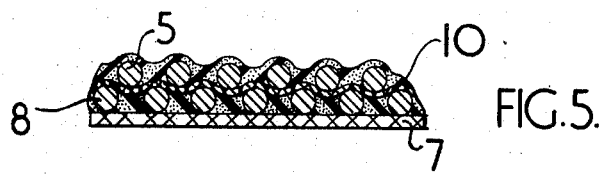
FIG. 5 illustrates another form of reinforcement strip.

In another embodiment the composite strip may contain more than one support layer of the porous matrix material. For example, in FIG. 4 a layer of matrix material (7 and 10) is applied above and below the reinforcement filaments 8. Yet another arrangement is illustrated in FIG. 5 in which there are two layers 8, 11 of reinforcement filaments and two layers of matrix material 7, 10.

A further hose construction is illustrated in FIG. 6. In this arrangement two layers of composite strip material are applied over the inner lining 1, one strip being wound right-handed and then the other strip being wound left-handed. The composite strips may be, for example, of any of the aforementioned constructions. Such hose structure provides a balanced hose which is preferable for heavy duty use.

In other embodiments (not illustrated) more layers of matrix material and reinforcement fibres may be used to form the composite strip and one or more composite strips may be used in winding the reinforcement onto the inner lining.

One example (not illustrated) of a multi-layer hose which is a balanced construction is to use three layers of composite strip. The first and third layers being wound left-handed and the second layer being wound right-handed. For the best use of the reinforcement members in the strips the right-handed strip is arranged to have double the strength value of either of the other strips so that the strength in each direction is substantially the same.

Figure 7:
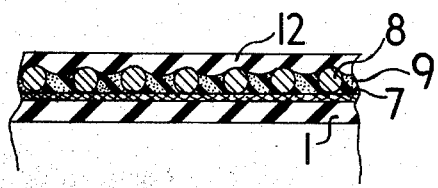
FIGS. 7 and 8 illustrate cross-sections of hose walls having an inner lining and an outer cover.
Figure 8:
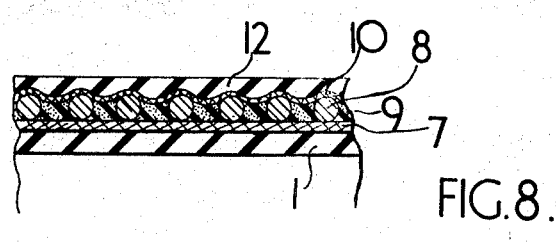

The hose constructed may also be provided with an outer covering layer 12 of elastomeric material as illustrated in FIGS. 7 and 8 as well as an inner lining, but both, separately can be used or both may be dispensed with for lightweight hoses. For example, in another embodiment of the invention, the hose may be made by winding two or more composite strips 6, 11 directly onto a mandrel 5 without an inner lining layer 1. The resultant hose is of very thin section and yet contains the necessary reinforcement filaments. Wide spacing of the reinforcing filament (for example two to four diameters) is possible for this lightweight hose as the matrix layer in conjunction with the spaced reinforcement members is sufficient for a low pressure light hose.

When fabricating the hose in this way it may be necessary to provide an edge which is free of reinforcing filaments to allow the material to be applied helically with an unreinforced edge overlap.

The reinforcing filaments 8 may be continuous or discontinuous filaments of synthetic textile material (e.g., Polyamides, Polyesters, Polypropylene, Rayon etc.), spun yarn, metal wire or glass fibre. They may also be constituted by strips slit from molecularly orientated plastics fibres in which case it is preferable to roll or fold the film before use.

The matrix material may be filaments or fibres of synthetic textile materials (for e.g., as detailed for the reinforcing members), metal wires, glass fibres or filaments and the matrix may be assembled by means other than heat sealing the cross-over points. For example the material of the matrix may be secured together by the material impregnating the layer which may be a rubber latex which may be applied by means of a latex applicator unit and then dried by heating. Other elastomeric material or other polymeric material, e.g., a thermosetting plastics material may be used. The material may or may not be vulcanisable. The covering of latex or other material may be very thin compared with the thickness of the matrix.

Other methods of assembling the matrix are to subject the matrix to a solvent, either in liquid or vapour form, until bonding occurs at the cross-over points or to chemically bond the filaments.

The matrix material may also be of paper. In this use the paper needs to be absorbant and porous to the impregnating material so that it will act in a similar manner to the porous matrix described above.

The reinforcing members in the normal type of hose may be of any of the usual single or multi-layer types. Braided, knitted, helically wound and woven reinforcing members may all be applied over or interspaced by layers of non-woven matrix material.

The reinforcing members in the strip assembly hoses are normally spaced by a distance substantially exceeding their diameter and in this case chemical pretreatment of the filaments to ensure bonding to the matrix is not necessary. However, in special cases, for example for aircract refuelling hose, the filaments are closely spaced. Chemical bonding between the filaments of the matrix may then be necessary, and is achieved, for example, by pre-treating the filament yarn with resorcinol formaldehyde latex or by incorporating resorcinol formaldhyde latex and silica in the elastomeric material used to impregnate the matrix. The necessity or otherwise for bonding depending on the final hose properties required.

In addition bonding of the matrix filaments to the reinforcing members may be carried out. Any of the above bonding processes is then suitable depending on the materials of the filaments and reinforcing members. The bonding may be carried out simultaneously with the bonding of the matrix or alternatively the reinforcing members may be bonded to a previously assembled matrix layer.

The strip assembled hose described above represent a substantial economic improvement over those described in Specification No. 1,033,547. The strip material of this earlier Specification consists of filaments embedded between two layers of rubber which cannot readily be made of a thickness less than 0.010 – 0.015 inch unless resort is made to special and expensive techniques, e.g., the use of cast latex film in place of calendered sheet rubber. The non-woven fabric matrix used in the hose according to the invention provides support for much thinner layers of polymer, e.g., the polymer thickness can be as low as 0.003 – 0.005 of an inch. Further, the matrix itself is very thin (for example 5 denier filaments), so that a hose with considerably thinner walls can be made for equivalent performance with resulting saving in materials. The use of such a thin matrix is possible due to the dimensional stability of the non-woven fabric and its relatively high strength/thickness ratio and despite the fact that some 80 percent of its volume is constituted by voids a relatively small amount of latex is needed to impregnate it. A suitable non-woven fabric may weigh as little as 0.3 oz. per square yard.

A further saving in capital and operating costs arises from the fact that there is no need to use an expensive calender for fabrication of the strip material, which can be fabricated by drawing a web of matrix material past a roller which applies latex to it and then over a heated cylinder, filamentary reinforcing material being fed between the coated web and the cylinder. The superposed matrix and filamentary material are then fed through a cooler and reeled, after slitting longitudinally to the desired strip width, to form packages to be used later in the lapping machine. Due to the thinness of the material much more can be accommodated in a package than is possible with the strip material of Specification No. 1,033,547 with the result that stoppages of the lapping machine for changing of the packages are considerably reduced.

By the use of a non-woven fabric or other matrix having a high modulus of elasticity for example nylon, of the order of 25 percent elongation at break, it becomes possible to use high shrinkage reinforcing yarns. The randomly distributed fibres or filaments of the matrix, together with the latex in the matrix, act despite the extreme thinness of the matrix as a barrier to prevent "cheese cutting." The latex initially applied to the matrix may not initially fill it to give the above-noted high modulus and it is to be understood that the figure of 25 percent elongation at break refers to the matrix as it exists in the hose after moulding. When the non-woven fabric has been filled with rubber the structure is substantially locked. When this material is incorporated into a hose structure any tendency to "cheese cutting" will be resisted by the matrix in the sense that each individual filament or fibre of the matrix will resist. Being locked, each filament or fibre will be bound, in general, to react according to its own inherent properties. Thus, for example, a non-woven fabric made of nylon filaments may elongate to say 100 percent or 200 percent at break. The elongation at break of the individual filaments, however, is only in the order of 15 percent. In the built hose, therefore, this particular material would resist "cheese cutting" during moulding on the basis of the 15 percent elongation at break characteristic of the individual filaments although there may be some additional apparent elongation created by easement of the filaments. Due to softening of the rubber during the early stages of vulcanisation individual filaments may be able to move a little.

The use of a high modulus matrix thus provides a generally increased modulus of the hose wall. The resistance of the hose to internal pressure is provided by:

a. The strength of the reinforcing filaments;
b. The provision of reinforcement filaments sufficiently closely placed to preclude the possibility of the main rubber wall being forced through the reinforcement complex when the hose is pressurised internally. The use of a high modulus carrier may therefore facilitate the use of increased spacing of the reinforcement filaments in some hoses even though the hose wall may be relatively thin.

If most of the constituent fibres or filaments of the non-woven fabric are orientated longitudinally, the tensile strength and modulus of the matrix may also make some contribution to the bursting strength of the hose.

The resisting force provided by the matrix of non-woven fabric is believed to be sufficient to prevent disorientation of the filaments and so eliminate or substantially reduce decay in tenacity. The matrix also increases the blow-through resistance of the hose wall through the inersticial spaces between the reinforcing filaments so permitting wider spacing of these filaments.

The non-woven matrix material may comprise the slit-film plastics material as described in the Specification of our co-pending Pat. Application No. 143,991 filed May 17, 1971. Application Nos. 142,998 of May 13, 1971 and 166,021 of July 26, 1971 also pertain to related subject matter and are incorporated herein by reference. May 21, 1970.

The inner lining and outer covering layer of the hose if used may be extruded onto the mandrel, spirally wrapped or applied in any of the usual ways dependent largely on the material used and surface finish required.

If an abrasion resistant outer cover is required an outer layer of matrix of non-woven material may be applied either after assembly or in conjunction with the last reinforcement strip and no outer cover of polymeric material is then applied prior to curing of the assembly.

The use of the matrix supporting layer for the reinforcing members allows the use of lining tube compounds hitherto unusable as the choice is no longer limited to materials having a relatively high plasticity at the curing temperatures.

Having thus described my invention, what I claim is:

1. A hose pipe comprising:
   a. a core tube;
   b. a layer of polymeric material in strip form around the core tube having an embedded reinforcement with a plurality of filaments extending longitudinally in the direction of the length of the strip and substantially parallel to the longitudinal axis of the strip;
   c. a support membrane of non-woven open structured randomly arranged filaments between the core tube and the polymeric material, said membrane having no substantial reinforcing strength but serving only to support the polymeric material and to prevent cheese cutting of the core tube by the strip on change in relative radial dimensions of the core tube and strip;
   d. said reinforcement filaments being located substantially directly on the non-woven support membrane.

2. The hose pipe of claim 1 in which the layer of polymeric material includes a layer of polymer on each side of the filaments and the reinforcement structure is bonded in the hose assembly.

3. The hose pipe of claim 1 in which the non-woven support membrane comprises nylon filaments interconnected at their cross-over points.

4. The hose pipe of claim 1 in which the non-woven support membrane is paper.

5. The hose pipe of claim 1 in which the strip of polymeric material is helically wound around the core tube and support membrane.

6. The hose pipe of claim 1 in which the filaments are spaced apart and parallel to each other.

7. The hose pipe of claim 1 in which the membrane is impregnated with rubber and the strip of reinforcing filaments is coated with rubber.

8. The hose pipe of claim 1 in which the non-woven support membrane is impregnated with polymeric material.

9. The hose pipe of claim 1 in which the non-woven filaments are embedded in vulcanized rubber, the core tube is vulcanized rubber and a vulcanized rubber sheath covers the reinforcement filaments.

* * * * *